United States Patent [19]

Namba

[11] Patent Number: 4,512,032
[45] Date of Patent: Apr. 16, 1985

[54] OPTICAL CHARACTER RECOGNITION APPARATUS

[75] Inventor: Hiromi Namba, Tokorozawa, Japan

[73] Assignee: Tokyo Shibaura Denki Kabushiki Kaisha, Kawasaki, Japan

[21] Appl. No.: 423,322

[22] Filed: Sep. 24, 1982

[30] Foreign Application Priority Data

Dec. 26, 1981 [JP] Japan ............................ 56-209508

[51] Int. Cl.³ ............................................. G06K 9/34
[52] U.S. Cl. ................................................... 382/9
[58] Field of Search ..................................... 382/9, 48

[56] References Cited
U.S. PATENT DOCUMENTS 3,219,974 11/1965 Rabinow ................................. 382/9
4,292,622 9/1981 Henrichon, Jr. ...................... 382/9
4,365,234 12/1982 Henrichon, Jr. ...................... 382/9
4,377,803 3/1983 Lotspiech et al. ..................... 382/9

Primary Examiner—Leo H. Boudreau
Attorney, Agent, or Firm—Cushman, Darby & Cushman

[57] ABSTRACT

An optical character recognition apparatus recognizes characters by comparing with the standard patterns the quantization patterns of the characters obtained by scanning a typewritten document by a photo-electric converter. The projection patterns of the quantization patterns of one line onto the horizontal line are obtained. The distances between the centers of two characters, with two other characters interposed therebetween, are calculated. The printing pitch is discriminated by discriminating if the distance between the centers of these characters is within a predetermined range.

10 Claims, 11 Drawing Figures

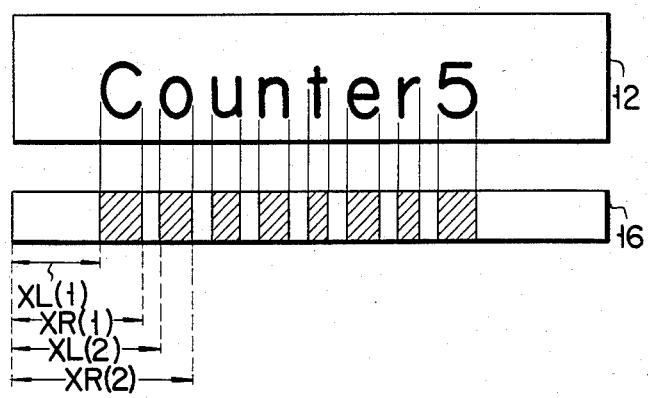
FIG. 2A
FIG. 2B
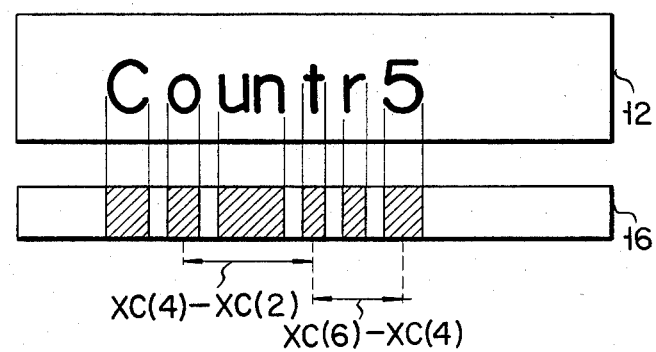
FIG. 5A
FIG. 5B
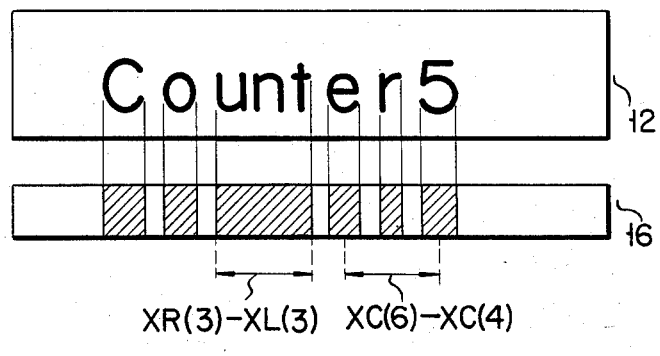
FIG. 6A
FIG. 6B

OPTICAL CHARACTER RECOGNITION APPARATUS

BACKGROUND OF THE INVENTION

The present invention relates to an optical character recognition apparatus for inputting a machine printed or machine written document into a word processor.

With recent developments in word processors, optical character recognition apparatus which can handle documents prepared by general typewriters are also being developed. A typewriter generally has two printing pitches of 10 and 12, which define the number of characters printed per inch. In an optical character recognition apparatus of this type, the printing pitch must therefore be selected. Conventionally, the operator visually determines the printing pitch and operates a switch or the like on the control panel of the apparatus to manually select the printing pitch. This operation is cumbersome and may give rise to erratic operation. If an erroneous printing pitch is selected, incorrect segmentation of the respective characters from a line of a document may be performed, resulting in erroneous recognition.

SUMMARY OF THE INVENTION

It is an object of the present invention to provide an optical character recognition apparatus which is capable of detecting the printing pitch of a printed document and which is capable of performing correct segmentation of the characters.

The above object of the present invention may be achieved by an optical character recognition apparatus comprising a photo-electric converter which scans a machine printed document so as to produce a binary signal representing quantization patterns of the document, a projection circuit which produces a binary signal representing projection patterns in which the quantization patterns of one line of the document are projected onto a horizontal line on the basis of the binary signal produced by the photo-electric converter, a discrimination circuit which calculates the position of the center of each character of the document and which discriminates the printing pitch on the basis of the distance between the centers of two characters of the document, and a recognition circuit which recognizes the quantization pattern for each character from the output signal of the photo-electric converter based on the printing pitch discriminated by the discrimination circuit.

BRIEF DESCRIPTION OF THE DRAWINGS

FIGS. 2A and 2B are views showing examples of character strings to be recognized;

FIGS. 5A, 5B, 6A and 6B are views for explaining other examples of character strings to be recognized.

DETAILED DESCRIPTION OF THE PREFERRED EMBODIMENTS

Figure 1:
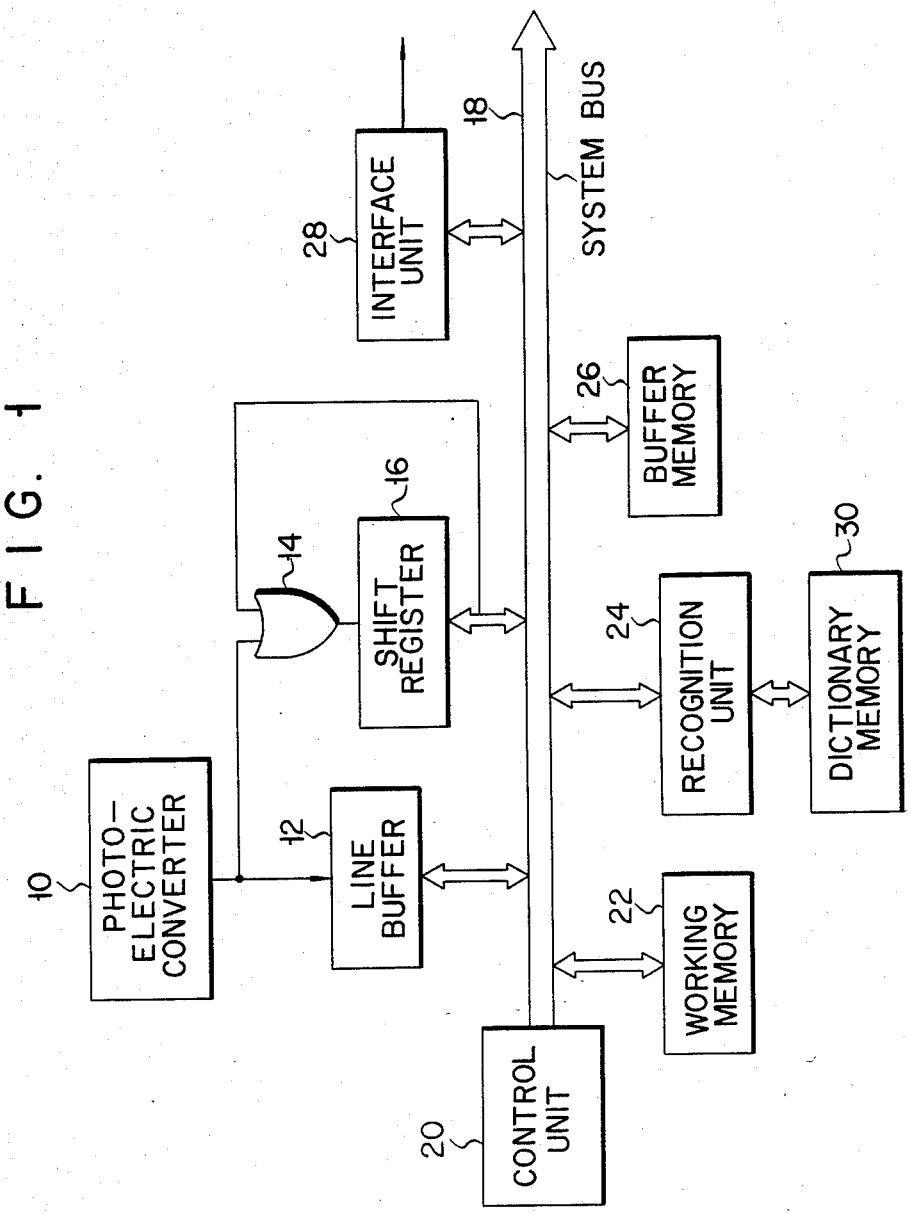
FIG. 1 is a block diagram of an optical character recognition apparatus according to an embodiment of the present invention.

An optical character recognition apparatus according to the preferred embodiment of the present invention will be described with reference to the accompanying drawings. FIG. 1 shows a block diagram of the apparatus. A photo-electric converter 10 scans a document; it radiates light onto the document and performs photo-electric conversion of the light reflected thereby, to produce a binary quantization pattern. The main scanning direction coincides with the printed lines of the document. The photo-electric converter 10 comprises a linear image sensor having a view large enough to cover the width of the document in the main scanning direction and a comparator for producing a binary signal having a level in accordance with the output signal from the linear image sensor. The linear image sensor includes a plurality of fine photo-diodes arranged in a straight line extending along the main scanning direction. Each photo-diode receives the light reflected from the corresponding fine spot on the document. The fine spot corresponds to the minimum unit of the photo-electric conversion. The photo-electric converter 10 produces the binary signal of "1" when it receives the light reflected from the spot on which the character is printed, i.e. the spot with a low reflection rate. The binary signal of "1" represents that the spot is black. Similarly, the photo-electric converter 10 produces the binary signal of "0" when it receives the light reflected from the spot on which the character is not printed. The binary signal of "0" represents that the spot is white. After the first main scanning operation is completed, the document is subscanned in the direction perpendicular to the main scanning direction for a distance corresponding to one photo-electric conversion element by a convey mechanism (not shown). The main scanning is performed from the left-hand edge to the right-hand edge of the document. In a similar manner, a binary signal representing the quantization pattern for each main scanning line is produced. The output signal from the photo-electric converter 10 is supplied to a line buffer 12 which has a capacity to store the quantization patterns for one line of the document and is also supplied to a first input terminal of an OR gate 14. The output signal from the OR gate 14 is supplied to a shift register 16. The shift register 16 has a capacity which is equal in number of bits to the binary signal obtained by one scanning of the photo-electric converter 10. The output signal from the shift register 16 is supplied to a system bus 18 and a second input terminal of the OR gate 14. One line of the document is scanned several times by the photo-electric converter 10. Logical additions of the binary signals obtained by several scans are stored in the respective bit positions of the shift register 16 when scanning of one line of the document is completed. In other words, projection patterns of the quantization patterns along the subscanning direction onto the horizontal line, are stored in the shift register 16. If the contents of the shift register 16 are cleared for each line, the projection patterns for one line, i.e., the binary data representing the width of each character, are generated. Output signals from the line buffer 12 and the shift register 16 are supplied through a system bus 18 to a control unit 20 which performs pitch discrimination and controls the timing of other units. The control unit 20 comprises herein a Four-Bit Bipolar Microprocessor Slice Am 2901 (Advanced Micro Devices, Inc.). The system bus 18 is connected to a working memory 22 for the control unit 20, a recognition unit 24 for pattern matching, a buffer memory 26 for temporarily storing the recognition results, and an interface unit 28 for supplying the recognition results to an external device such as a word processor. A dictionary memory 30 for storing the standard pattern of each character for each font is connected to the recognition unit 24.

The operation of this embodiment will now be described. The principle of operation of this embodiment will first be described. When scanning of one line of the document is completed, the quantization patterns and the projection patterns as shown in FIGS. 2A and 2B, respectively, are stored in the line buffer 12 and the shift register 16. Then, the operation of the photo-electric converter 10 is temporarily stopped. Assume that the quantization patterns of a character string "Counter5" are stored in the line buffer 12. In the projection patterns stored in the shift register 16, the black portion corresponds to a logic level of "1" and the white portion corresponds to a logic level of "0". The control unit 20 sequentially reads out data from all the bits of the shift register 16 and calculates the right- and left-hand edges of the projection pattern of each character as measured from the left-hand edge of the document. More specifically, the abscissa XL of the left-hand edge of each character from the left-hand edge of the document may be calculated on the basis of the resolving power of the photo-electric converter 10 by sensing the string of data read out from the shift register 16 and by counting the number of bits after which the data changes from "0" to "1". In a similar manner, the abscissa XR of the left edge of each character from the left-hand edge of the document is determined by sensing the number of bits after which the data changes from "1" to "0". The control unit 20 calculates the abscissa $XC = (XR - XL)/2$ of the center of each character from the left-hand edge of the document. The control unit 22 then stores the three pieces of data obtained in this manner in the working memory 22.

Figure 3:
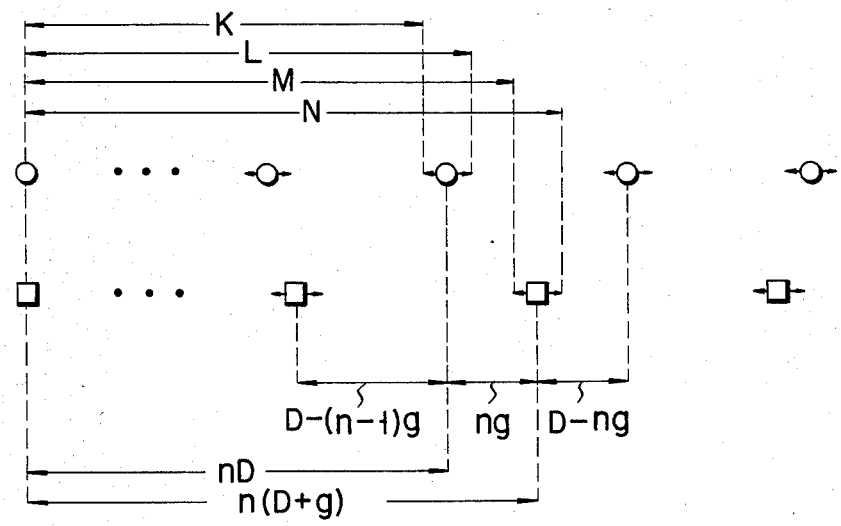
FIG. 3 is a diagram for explaining the principle of pitch discrimination.

The abscissa XC may be used to perform pitch discrimination. Since the abscissa XC is measured from the left-hand edge of the document, but printing is generally initiated with a certain margin at the left-hand edge of the paper, the abscissa XC may not directly be used for pitch discrimination. For this reason, a distance measured from the center of a predetermined character in one line is considered. FIG. 3 shows the printing positions of the $\{i+(n-1)\}$th, $(i+n)$th and $\{i+(n+1)\}$th characters in 10 and 12 pitches when the abscissa XC(i) of the center of the ith character counted from the left-hand edge of one line is taken as a reference. In FIG. 3, the circular mark "o" represents the case of 12 pitch and the square mark "□" represents the case of 10 pitch. The broken lines corresponding to the centers of these marks represent the centers of the characters. In order to account for the printing error in a typewriter, the arrows at both sides of each mark represent tolerances of the printing positions. Therefore, if the centers of the 10 pitch characters and the 12 pitch characters do not overlap, and if K, L, M and N are given as constants, the pitch of a given document may be discriminated according to the following relationships:

12 pitch:

$$K \leq XC(i+n) - XC(i) \leq L \quad (1)$$

10 pitch:

$$M \leq XC(i+n) - XC(i) \leq N \quad (2)$$

Figure 4:
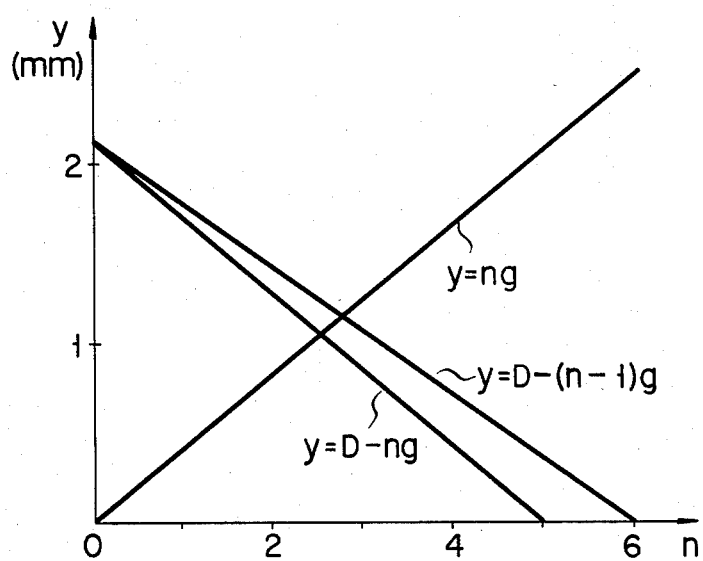
FIG. 4 is a graph showing the optimal conditions for pitch discrimination.

A description will now be made of the optimal number for n, to distinguish between 10 and 12 pitch characters, where n is the number of characters separating the two characters, the distance therebetween is to be compared with a constant. Referring to FIG. 3, D is the distance between the centers of two adjacent characters printed in 12 pitch, and is $25.4/12 = 2.12$ mm. $(D+g)$ is the distance between the centers of two adjacent characters printed in 10 pitch, and is $25.4/10 = 2.54$ mm. It is therefore seen from FIG. 3 that the greater the respective values of $D-(n-1)g$, $ng$ and $D-ng$, the smaller the error rate. FIG. 4 shows the functions of $y = D-(n-1)g$, $y = ng$ and $y = D-ng$ where n is a variable. It is seen from FIG. 4 that the optimal discrimination may be performed when $n = 3$.

The above description is made about the case where the projection patterns of the respective characters are separated from each other. However, in practice, printing error may be too great and the projection patterns of the respective characters may not be separated. A description will now be made on such a case. FIGS. 5A and 5B respectively show the quantization patterns and the projection patterns where the projection patterns of two characters overlap each other. In such a case, the distances between the centers of the overlapping projection patterns is not used. Instead, the distance $XC(4) - XC(2)$ between the second character "o" and the fourth character "t" or the distance $XC(7) - XC(4)$ between the fourth character "t" and the seventh character "5" may be substituted in relationships (1) and (2) above. FIGS. 6A and 6B show the quantization patterns and the projection patterns when the projection patterns of three characters overlap. In this case, pitch discrimination may not be performed in accordance with relationships (1) and (2). The pitch discrimination may, however, be performed in accordance with the following relationships using the length $XR(i) - XL(i)$ of the projection pattern of one block consisting of the projection patterns of n characters and by setting the constants R, S, T and U.

12 pitch:

$$nR \leq XR(i) - XL(i) \leq nS \quad (3)$$

10 pitch:

$$nT \leq XR(i) - XL(i) \leq nT \quad (4)$$

In this case, the error rate is smallest when $n = 3$, as in the former case. In the case shown in FIGS. 6A and 6B, the constants in relationships (1) and (2) may be modified for two characters using the distance $XC(6) - XC(4)$ between the fourth character "e" and the sixth character "5".

Figure 7A:
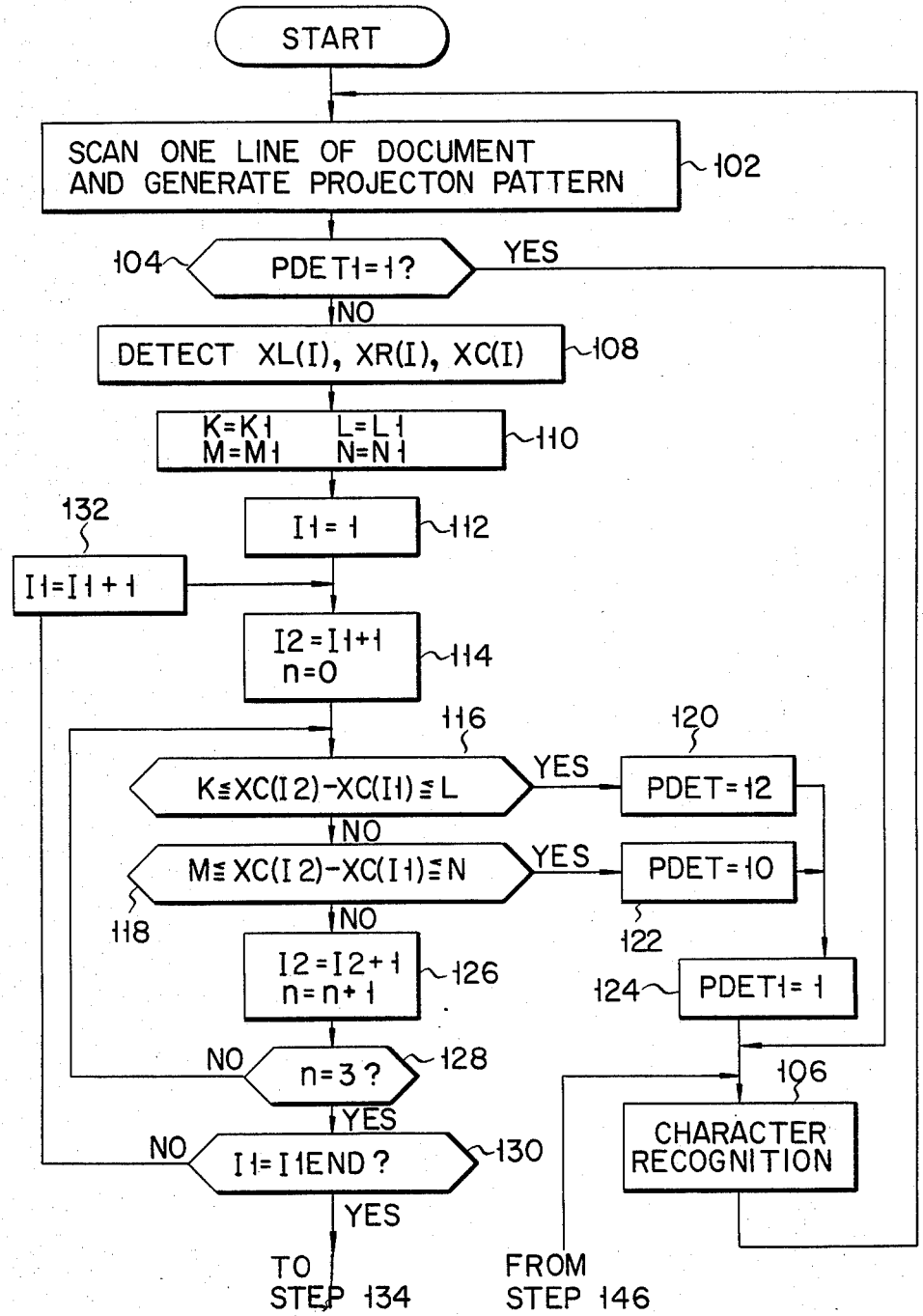
FIGS. 7A and 7B are flowcharts showing the operation of the embodiment shown in FIG. 1.
Figure 7B:
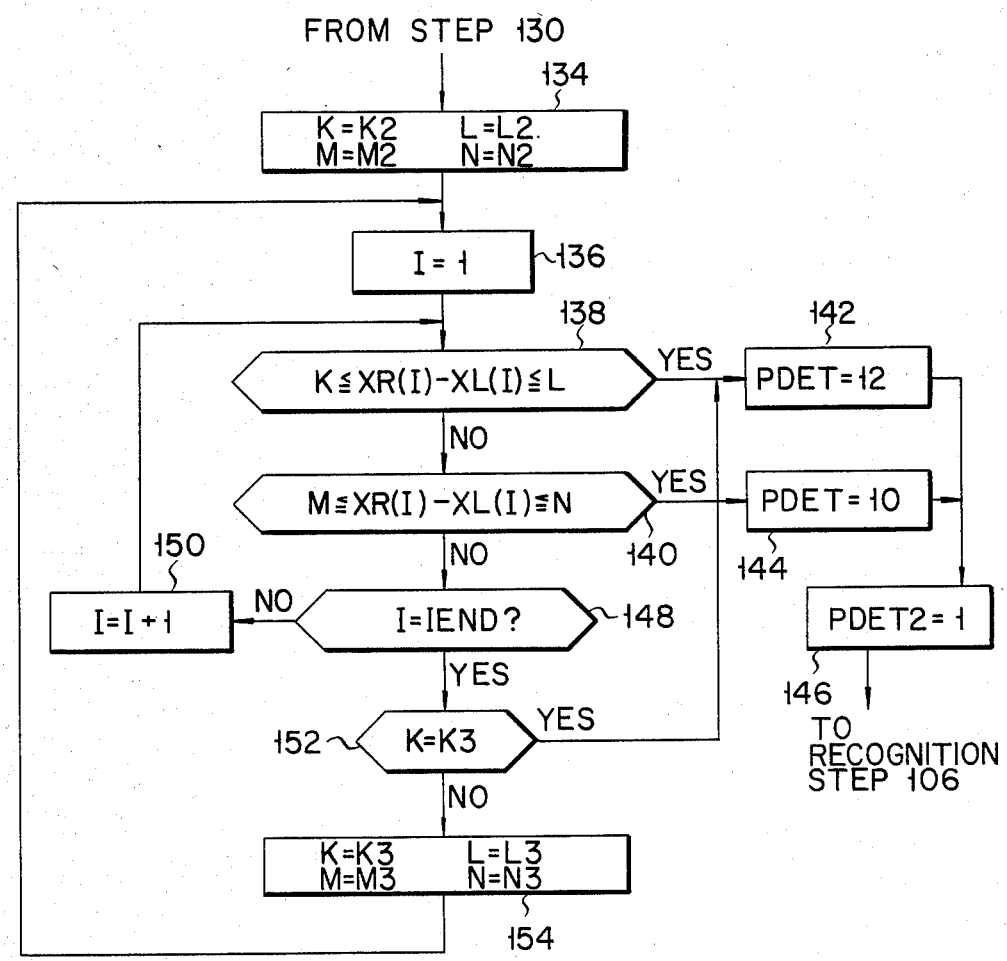

The operation of the embodiment of the present invention in accordance with the principle of operation as described above will be described with reference to the flowchart shown in FIGS. 7A and 7B. After the document is set on the convey mechanism, one line of the document is subjected to photo-electric conversion, the quantization patterns are stored in the line buffer 12, and the projection patterns thereof are generated in the shift register 16 in step 102. When photo-electric conversion for one line is completed, it is discriminated in step 104 if the printing pitch has been determined. More specifically, it is discriminated whether a flag PDET1 is "1" or "0" since the flag PDET1 is set if the printing pitch has been determined as described later. If step 104 is YES, the character recognition step 106 is executed, while if step 104 is NO, the following steps for discriminating the printing pitch are executed. In step 108, the abscissas XL(i), XR(i) and XC(i) of the left-hand edge, the right-hand edge and the center of each projection pattern respectively from the left-hand edge of the document are calculated. These abscissas are stored in the working memory 22. In this discrimination, it is assumed that the projection patterns of the respective characters are separated from each other. For this purpose, in step 110, constants K1, L1, M1 and N1 are substituted in the constants K, L, M and N respectively, in relationships (1) and (2). These constants K1, L1, M1 and N1 represent the distances between the centers of the reference characters and the centers of the third characters from the reference characters, respectively, for 10 and 12 pitch characters. In step 112, I1 is set to 1. In step 114, I2 is set to I1+1 and n is set to 0. I1 represents the reference position. In this case, the first character is the reference character. In step 116, it is discriminated whether XC(I2)−XC(I1) is within the range of K to L. In general, NO is obtained in the first loop of flow. However, YES may be obtained in step 116 if there are two blank spaces between the first character and the second character. If step 116 is NO, it is then discriminated in step 118 whether XC(I2)−XC(I1) is within the range of M to N. Steps 116 and 118 respectively correspond to relationships (1) and (2). If YES is obtained in steps 116 and 118, respectively, the printing pitch PDET is determined to be 12 and 10 in steps 120 and 122, respectively. After step 120 or 122, the flag PDET1 representing the determination of the printing pitch is set to 1 in step 124. The character recognition step 106 is then executed. In step 106, the quantization pattern of one character is sequentially segmented from the output of the line buffer 12 in accordance with the determined printing pitch, and is matched with the standard pattern by the recognition unit 24. The recognition unit 24 temporarily stores the obtained results in the form of a character code in the buffer memory 26 and supplies it to the outside through the interface unit 28. When recognition for one line is performed, step 102 is executed again, and processing of tne next line is performed. If the printing pitch is determined in processing data of the first line, step 106 is executed immediately after completion of scanning for processing the data of the subsequent lines.

If NO is obtained in steps 116 and 118, respectively, I2 and n are both incremented by 1 in step 126. It is discriminated in step 128 whether n=3. If step 128 is NO, step 116 is executed again. The parameter n is used in consideration of the blank portion as described above. That is, if there is no blank portion, the discrimination of XC(i+3)−XC(i) may suffice. This processing can also handle the distances, XC(i+2)−XC(i) and XC(i+1)−XC(i) considering the case where there is a blank portion. If step 128 is YES, it is then discriminated in step 130 if the reference position has reached the right-hand edge of one line of the document. More specifically, it is discriminated in step 130 whether I1 =I1END where I1END represents the last character in one line. If step 130 is NO, I1 is incremented by one in step 132 and step 114 is executed again. Incrementation of I1 by one is equivalent to shifting the reference position to the right by one character.

If step 130 is YES, it means that the printing pitch is not determined in accordance with relationships (1) and (2). Therefore, it is assumed that the projection patterns of three characters overlap each other, and the discrimination is performed in accordance with relationships (3) and (4). Thus, in step 134, the constants K, L, M and N for the discrimination are all reset. K2, L2, M2 and N2 are respectively nR, nS, nT and nU in relationships (3) and (4) when n=3. In step 136, the parameter I representing the projection pattern is set to 1. In step 138, it is discriminated whether XR(I)−XL(I) is within the range of K to L. If step 138 is NO, it is then discriminated in step 140 whether XR(I)−XL(I) is within the range of M to N. Steps 138 and 140 respectively correspond to relationships (3) and (4). If YES is obtained in steps 138 and 140, respectively, the printing pitch is determined to be 12 and 10, respectively, in steps 142 and 144. In this case, the printing pitch is not determined by the relationships (1) and (2) up to step 130 and printing conditions are relatively poor. Therefore, the discrimination result is temporarily held, and the flag PDET1 is not set to 1. Instead, the flag PDET2 is set to 1 in step 146 and the recognition step 106 is then executed. If NO is obtained in steps 138 and 140, respectively, it is discriminated in step 148 if the projection pattern of the right-hand edge of one line has been reached, i.e., whether I=IEND representing the last projection pattern of one line. If step 148 is NO, the projection pattern is shifted to the right, i.e., I is incremented by one in step 150. Step 138 is executed again. If step 148 is YES, it is then discriminated in step 152 if K=K3. K3 corresponds to K in relationship (3) when the projection patterns of four characters overlap each other. If the discrimination of the printing pitch is not accomplished even if the width of the projection patterns of three characters is used, this step is used to allow discrimination of the printing pitch using the width of the projection patterns of four characters. If step 152 is NO, the constants K, L, M and N are all changed to correspond to the width of the four characters, and step 136 is executed. If step 152 is YES, the printing pitch still cannot be discriminated even with the width of the projection patterns of four characters. Therefore, the discrimination steps cannot be performed in this case. In general, such a document is a document of 12 pitch. For this reason, in this embodiment, the printing pitch is temporarily determined to be 12 in step 142. If the printing pitch is temporarily determined in this manner, PDET1 is not set to 1. Therefore, the discrimination is performed again in processing the data of the next line. To deal with the case where the temporary discrimination result is erroneous, the quantization patterns of several lines are stored and recognition is performed again.

As described above, the embodiment of the present invention provides an optical character recognition apparatus wherein the printing pitch may be automatically detected by the projection pattern of the character so that the labor of the operator may be reduced, erroneous selection of the printing pitch by the operator may be eliminated, and characters may be correctly recognized. Although the above description is made with reference to the case of typewriter printing, the present invention is similarly applicable to other types of printing if the printing pitches are known in advance. The number of types of printing pitches are not limited to two and may be three or more.

What is claimed is:

1. An optical character recognition apparatus comprising:
   photo-electric converting means for scanning printed lines of a machine printed document to produce binary signals representing quantization patterns of characters in the document;
   projecting means for producing binary signals representing projection patterns in a horizontal line which coincides with the printed line of the quantization patterns of one line of the document, on the basis of the binary signals produced by said photo-electric converting means;
   discriminating means, connected to said projecting means, for discriminating one of a plurality of printing pitches by determining whether or not the distance between centers of two projection patterns is within a predetermined range, which is determined by the distance between centers of two projection patterns with one or more other projection patterns and spaces interposed therebetween in each of the plurality of printing pitches and the printing position error, and for discriminating the one printing pitch according to the determination result; and
   recognizing means for determining the quantization pattern of each character from the output of said photo-electric converting means based on the one printing pitch discriminated by said discriminating means and for recognizing the character.

2. An optical character recognition apparatus comprising:
   photo-electric converting means for scanning printed lines of a machine printed document to produce binary signals representing quantization patterns of characters in the document;
   projecting means for producing binary signals representing projection patterns in a horizontal line which coincides with the printed line of the quantization patterns of one line of the document, on the basis of the binary signals produced by said photo-electric converting means;
   discriminating means, connected to said projecting means, for discriminating one of a plurality of printing pitches by determining whether or not the width of a projection pattern is within a predetermined range, which is determined by the width of at least three projection patterns in each of the plurality of printing pitches and the printing position error, and for discriminating the one printing pitch according to the determination result; and
   recognizing means for determining the quantization pattern of each character from the output of said photo-electric converting means based on the one printing pitch discriminated by said discriminating means and for recognizing the character.

3. An apparatus according to claim 1 or 2, wherein said discriminating means discriminates a smallest one of the printing pitches if no determination can be made.

4. An apparatus according to claim 1 or 2, wherein said photo-electric converting means samples at M sampling points in a line of the document in a vertical direction perpendicular to the line, samples at N sampling points in a horizontal direction, and produces a binary signal for each of the sampling points in the horizontal direction; and said projecting means comprises an OR gate whose first input terminal receives the binary signal from said photo-electric converting means, and an N-bit shift register which receives an output signal from said OR gate and whose output signal is supplied to a second input terminal of said OR gate, the projection patterns being generated in said shift register.

5. An apparatus according to claim wherein said photo-electric converting means has an $M \times N$-bit line buffer, interrupts scanning after scanning of one line, and performs scanning of the next line after recognition by said recognizing means is completed for the one line.

6. An apparatus according to claim 1, wherein said predetermined range is determined such that the minimum value of $ng$, $D-ng$ and $D-(n-1)g$ is maximum, where n is the number of projection patterns interposed between said two projection patterns, D and $D+g$ are the distances between two adjacent characters printed in 12-pitch and 10-pitch, respectively.

7. An apparatus according to claim 6, wherein said number n is 2 or 3.

8. An apparatus according to claim 2, wherein said discriminating means discriminates a smallest one of the printing pitches if no determination can be made.

9. An apparatus according to claim 2, wherein said predetermined range is determined such that the minimum value of $ng$, $D-ng$ and $D-(n-1)g$ is maximum, where n is the number of said at least three projection patterns, D and $D+g$ are the distances between two adjacent characters printed in 12-pitch and 10-pitch, respectively.

10. An apparatus according to claim 9, wherein said number n is 3 or 4.

* * * * *